(12) United States Patent
Schmuck et al.

(10) Patent No.: US 8,777,473 B2
(45) Date of Patent: Jul. 15, 2014

(54) LIGHT DEVICE

(75) Inventors: Eric Schmuck, Dusseldorf (DE);
Hans-Gerd Vollmers, Cologne (DE);
Manfred Bosler, Willich (DE); Tilo Remhof, Hilden (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/885,441

(22) PCT Filed: Dec. 9, 2011

(86) PCT No.: PCT/US2011/064145
§ 371 (c)(1),
(2), (4) Date: May 15, 2013

(87) PCT Pub. No.: WO2012/082549
PCT Pub. Date: Jun. 21, 2012

(65) Prior Publication Data
US 2013/0250607 A1 Sep. 26, 2013

(30) Foreign Application Priority Data
Dec. 17, 2010 (EP) .................................... 10195737

(51) Int. Cl.
*B60Q 1/00* (2006.01)

(52) U.S. Cl.
CPC ............ *G02B 6/0093* (2013.01); *B60Q 1/0005* (2013.01); *G02B 6/005* (2013.01); *G02B 6/0035* (2013.01)
USPC .......................................... 362/602; 362/603

(58) Field of Classification Search
USPC ....................................................... 362/602
See application file for complete search history.

(56) References Cited

U.S. PATENT DOCUMENTS

| | | | |
|---|---|---|---|
| 5,432,876 A | 7/1995 | Appeldorn et al. | |
| 5,631,994 A | 5/1997 | Appeldorn et al. | |
| 5,845,038 A | 12/1998 | Lundin et al. | |
| 6,123,442 A | 9/2000 | Freier et al. | |

(Continued)

FOREIGN PATENT DOCUMENTS

| CN | 201071559 | 6/2008 |
|---|---|---|
| DE | 100 31 527 | 1/2002 |

(Continued)

OTHER PUBLICATIONS

PCT International Search Report from PCT/US2011/064145 mailed Sep. 9, 2012, 10 pages.

*Primary Examiner* — Mary Ellen Bowman
(74) *Attorney, Agent, or Firm* — Robert S. Moshrefzadeh (57) ABSTRACT

The present invention provides in one aspect a light device having a light guide. The light guide (20) has at least one major side defining a light extraction side (26). The light device further has at least one fibrous layer (30), typically a non-woven or woven fibrous layer, disposed on the major side of said light guide defining said light extraction side. At the light extraction side, the light device has a plurality of discrete bonding areas (40) at which the at least one fibrous layer is bonded to the major side of said light guide. In a particular aspect, the bonding areas define light extraction elements on the light extraction side. Such an arrangement typically provides for an easy, reliable and cost-effective light device useful for a variety of applications including, for example, illuminating the interior of a vehicle.

14 Claims, 7 Drawing Sheets

(56) References Cited

U.S. PATENT DOCUMENTS

| | | |
|---|---|---|
| 6,259,855 B1 | 7/2001 | Lundin |
| 6,301,418 B1 | 10/2001 | Freier et al. |
| 6,367,941 B2 | 4/2002 | Lea et al. |
| 6,447,135 B1 | 9/2002 | Wortman et al. |
| 6,763,172 B2 | 7/2004 | Sahlin et al. |
| 6,952,310 B1 | 10/2005 | Miyatake et al. |
| 2004/0240829 A1 | 12/2004 | Sahlin et al. |
| 2006/0262310 A1 | 11/2006 | Starry et al. |
| 2007/0037462 A1 | 2/2007 | Allen et al. |
| 2008/0080055 A1 | 4/2008 | Lightfoot et al. |
| 2009/0034287 A1 | 2/2009 | Nagasawa et al. |
| 2009/0251917 A1* | 10/2009 | Wollner et al. ............... 362/543 |
| 2010/0014164 A1 | 1/2010 | O'Brien |
| 2010/0142226 A1 | 6/2010 | Vogt et al. |
| 2011/0134623 A1 | 6/2011 | Sherman et al. |
| 2011/0176325 A1 | 7/2011 | Sherman et al. |

FOREIGN PATENT DOCUMENTS

| | | |
|---|---|---|
| DE | 102 59 623 | 7/2004 |
| EP | 2 103 972 | 9/2009 |
| WO | WO 00/25159 | 5/2000 |
| WO | WO 01/51851 | 7/2001 |
| WO | WO 2008/125339 | 10/2008 |

\* cited by examiner

LIGHT DEVICE

The present invention relates to a light device comprising a light guide. In particular, the invention relates to a light device comprising a light guide and a fibrous layer. The present invention also relates to a vehicle comprising the light device and to a use of the light device for illuminating the interior of a vehicle with ambient lighting. The invention further relates to a method of making a light device.

Light guides are increasingly being used for decorative and functional lighting purposes in various locations, some of which require the light guide to emit light selectively along one of its major sides. Light guides that are generally planar having opposite major sides with light being extracted along one of each major sides are referred to in this application as flat light guides. The use of flat light guides in lighting devices offers certain advantages: these include, for example, the possibility of using a low voltage light source such as an LED light source, and to position the light source remote from the area where the light is emitted.

One form of light guide, an elongated light guide, is described in EP-A-0 594 089 (in the name of Minnesota Mining and Manufacturing Company). The guide has light-extraction elements spaced along its length to cause light that is being propagated along the guide from at least one end thereof to be emitted selectively through a light-emitting region in the wall of the guide. In that case, the light-extraction elements comprise notches in the light guide, each notch having at least one reflecting surface of optical quality i.e. a surface that diffusely scatters only a small amount (generally less than 20%) of the light incident upon it. EP-A-0 956 472 (in the name of Minnesota Mining and Manufacturing Company) and EP-A-1 153 240 (in the name of 3M Innovative Properties Company) both describe other light guides of that type: in the guide described in EP-A-0 956 472, two sets of notches centered along different longitudinal axes are provided with a view to controlling the lateral distribution of light emitted by the guide while, in the guide described in EP-A-1 153 240, the notches have different notch angles with a view to producing a predetermined pattern in the illumination provided by the guide. Generally, light guides of that type offer the advantage that they can be designed to emit light very efficiently along their length and in a preferred direction with a pre-selected distribution, making them suitable for use in lighting devices in a wide number of applications. Other forms of light guides are described, for example, in WO 99/22173, WO 00/25159 and WO 01/51851. WO 99/22173 (in the name of 3M Innovative Properties Company) describes a light guide comprising a core surrounded by cladding, in which the inner surface of the cladding is formed with indentations that cause light to be extracted from the light guide. A light-reflecting member may be provided around a portion of the light guide to redirect some of the extracted light in a particular direction. WO 00/25159 (in the name of Minnesota Mining and Manufacturing Company) describes a light guide comprising a core surrounded by a two-part cladding layer, in which the cladding incorporates various reflective materials to enhance the extraction and uniformity of the light emitted by the guide along its length. WO 01/51851 (in the name of 3M Innovative Properties Company) describes a light guide having light extraction structures spaced along its length to cause light to be directed from the light guide towards a diffuse reflective layer that, in turn, directs the light back through the light guide so that it is finally emitted through the region of the guide in which the light extraction structures are located WO 2010/017087 (in the name of Minnesota Mining and Manufacturing Company) describes an optical device including a light source and an optical article. The optical article includes a light guide and a viscoelastic layer disposed on the light guide. Light emitted by the light source enters the light guide and is transported within the light guide by total internal reflection. The viscoelastic layer manages light, for example, at least about 50%, or less than about 10%, of light that enters the light guide may be extracted. The optical device can be used in a variety of constructions for signs, markings, display devices, keypad assemblies, tail light assemblies and illumination devices.

WO 2010/005655 (in the name of Minnesota Mining and Manufacturing Company) describes an optical device having a light source and a viscoelastic light guide. Light from the light source enters the viscoelastic light guide and is transported within the light guide by total internal reflection. The viscoelastic light guide may comprise a pressure sensitive adhesive. The optical device may be used in a variety of constructions wherein the device emits light being transported within the viscoelastic light guide. Constructions include those used for signs, markings, illumination devices, display devices, keypad assemblies and tail light assemblies for vehicles.

WO 2001/27529 (in the name of Minnesota Mining and Manufacturing Company) describes a light guide including an input edge surface, a back surface and an output surface. A reflector directly secured to the back surface by, for example, adhesive bonding.

US 2008/0080055 (Lightfood et. al.) describes diffuse reflectors of visible light comprising a nonwoven sheet having on at least one face thereof a binder layer comprising a binder and a scatterer of visible light dispersed in the binder. These diffuse reflectors have utility in light management in optical displays such as backlit LCD displays for lap top computers and televisions.

US 2006/0262310 (Starry et. al.) describes a diffuse reflective article including a diffuse reflector of light positioned within a structure defining an optical cavity. The diffuse reflector is a nonwoven sheet containing a plurality of inter-fiber and intra-fiber pores of optimal light scattering dimension. Also provided is an optical display, including: (i) a structure defining an optical cavity; (ii) a light source positioned within the optical cavity; (iii) a display panel through which light from the light source passes; and (iv) a diffuse reflector positioned within the optical cavity for reflecting light from the light source toward the display panel, wherein the diffuse reflector is a nonwoven sheet containing a plurality of inter-fiber and intra-fiber pores of optimal light scattering dimension.

Light guides are available in both flexible and rigid forms, and in materials that will not break or shatter and have a comparatively long useful life. They are also capable of providing a high level of illumination in an energy-efficient manner. Lighting devices incorporating light guides have already been used in various locations. They can, for example, be used as cost effective, safe, versatile alternatives to fluorescent tubes in commercial, architectural, and consumer lighting applications but can also be used in situations in which fluorescent tubes are impractical and/or to achieve effects that cannot be obtained using conventional lighting devices. For example, there is increasing interest in the use of light guides in lighting devices in vehicles and it has already been proposed to use such devices on the outside of a vehicle, to outline features such as the rear window or the boot. More recently, manufacturers have become interested in using light guides in lighting devices in car interiors for both practical and aesthetic reasons as described in, for example, DE-A-100 31 527 in the name of Volkswagen AG and DE-A-102 59 623 in the name of Hella KG Hueck & Co. In a lighting device, elongate side light guides of the type described in EP 594089 are usually supported in some way, to retain it in the required position and ensure that light is emitted in the required direction. Known methods of supporting light guides include the use of brackets or clips (for example, as described in U.S. Pat. No. 6,763,172 of 3M Innovative Properties Company), and channels or rails (for example, as described in US 2004/0240829 also of 3M Innovative Properties Company, in WO 99/22174 of Minnesota Mining and Manufacturing Company, and in the above-mentioned WO 00/25159). In the particular case in which a light guide is used as a lighting device for a car interior, the above-mentioned DE-A-100 31 527 and DE-A-102 59 623 describe that it may be located in a gap in the interior lining of the vehicle. WO 2008/022007 (3M Innovative Properties Company) describes various forms of light guides and supports for facilitating the assembly of lighting devices.

It would now be desirable to find further light guides for light devices. Desirably, the light guide would be easy and convenient to manufacture and be of low cost. Desirably, the light guide has good light output allowing desired or required light output and minimum power consumption. Low power consumption is typical of significant importance for application in vehicles. It would typically also be desired that the light guide can be readily or easily assembled in a light device at low cost. Desirably the assembly of the light guide into a light device and the resulting light device have a good or excellent balance of optical performance versus ease and cost of assembly. In particular with flexible or elastic light guides, it has been proven challenging to find a good balance between optical performance, i.e. light output, ease of assembly and reliability. Further, in order to minimize the cost of the light guide itself, it will generally be desired to use inexpensive material and a minimal amount of different materials. This requirement has been found to further complicate finding a cost effective assembly while maximizing retention of optical properties of the light guide. It would particularly desirable to find a light guide for a light device which can easily and reliably be integrated into parts of vehicles such as door parts, roof parts etc. Further, requirements for vehicles are desirably fulfilled, such as avoidance of rattling as well as security aspects for interior vehicle parts without compromising the light output of the light device. Yet further, the performance of light guides is typically susceptible to dirt and finger prints and the like collecting on the surface of the light guide. Hence, light guides typically need to be handled with care prior to their assembly into a final application such as for example in a vehicle. This makes the handling and assembly of light guides more cumbersome.

The present invention provides in one aspect a light device having a light guide. The light guide has at least one major side defining a light extraction side. The light device further has at least one fibrous layer, typically a non-woven or woven fibrous layer, disposed on the major side of said light guide defining said light extraction side. At the light extraction side, the light device has a plurality of discrete bonding areas at which the at least one fibrous layer is bonded to the major side of said light guide.

In a particular aspect, the bonding areas define light extraction elements on the light extraction side. Such an arrangement typically provides for an easy, reliable and cost-effective light device useful for a variety of applications including, for example, illuminating the interior of a vehicle. The light device can easily be integrated into parts of a vehicle without exhibiting for example rattling. Further layers, for example foam layers or fabric cover layers typically used for vehicle interior covering, can easily and cost-efficiently be bonded to the light device in accordance with automotive manufacturing requirements whilst providing uniform and good light output. Also, the fibrous layer additionally protects the surface of the light guide, hence making it less susceptible to collecting dirt and finger prints.

The term "light extraction side" is intended to describe the side of the light guide from which a substantial or major part of the light injected by a light source into the light guide is emitted.

The term "discrete bonding areas" is intended to describe individual areas in which the fibrous layer is bonded to the light guide. The bonding areas typically have a refractive index which is similar to or higher than the refractive index of the light guide. When the bonding areas have a refractive index similar or higher than that of the light guide, the discrete bonding areas can function as light extraction elements of the light guide. However, in a particular embodiment, the refractive index of the bonding area may be less than that of the light guide. Shape and size of the bonding areas may vary widely. The shape may be any regular or irregular shape. Suitable shapes include dots which may be generally circular, elliptical, square or rectangular. Also a discrete bonding area if desired may be a stripe or a line. Typically, the size of discrete bonding area will be not more than 2 mm$^2$, for example not more than 1.5 mm$^2$ or not more than 1 mm$^2$ or not more than 0.8 mm$^2$ or not more than 0.5 mm$^2$. Generally, the discrete bonding areas will cover only a small fraction of the total surface area of the light guide on the major side of the light guide where the discrete bonding areas are provided. Typically, the discrete bonding areas will cover less than 30%, for example not more than 20% or not more than 10% of the total surface area on the major side of the light guide where they are provided. In a particular embodiment, the amount of surface covered is not more than 5%.

Typically, the light guide of the light device has a cuboid shape having two opposite major sides and at least one side there between being substantially perpendicular to the major sides. The major sides may have a square or rectangular cross-section. One or more of the sides perpendicular to the major sides may define a light input side. Light injected into the light input side will propagate along the light guide. Other shapes, for example disc shapes having major sides with round or oval cross-sections, are conceivable as well.

Light injected by a light source into a light guide at one side will generally propagate along the light guide substantially along the two orthogonal directions (for example length and width) in plane with the light guide, by total internal reflection at the interface between the light guide and the surrounding material, for example air.

In a preferred embodiment, the bonding areas define light extraction elements on the surface of the major side of the light guide defining the light extraction side. Light impinging on the internal surface of the light guide, where bonding areas are arranged, will be extracted out of the light guide, i.e. towards the fibrous layer, typically a woven or non-woven fibrous layer, which is bonded to the light extraction side of the light guide in the bonding areas. No further light extraction elements, e.g. notches or any other means on the light extraction side, may be needed, depending on the desired light output. This supports easy and cost-efficient manufacture of a light device. However, in a particular embodiment, further and additional light extraction elements may be provided.

In one embodiment, the bonding areas may be provided by means of thermobonding. The light guide as well as the fibrous layer, typically a woven or non-woven fibrous layer, may comprise thermoplastic material to facilitate creation of the bonding areas by point-wise application of heat to melt the respective material of the light guide and/or the fibrous layer to form the bonding area, respectively.

In another embodiment, the bonding may be provided by means of welding, for example ultrasonic welding or laser welding, which means that the light guide and/or the fibrous layer comprises thermoplastic material to facilitate creation of the bonding areas. The bonding may be achieved by the point-wise application of ultrasonic energy or laser to the contact point between the light guide and the fibrous layer, typically a woven or non-woven fibrous layer, such that the respective material is melted to form the bonding area. Such a welding operation may provide for a fast and cost-effective way of providing bonding areas. No further (bonding) material is required. This supports easy and cost-efficient manufacture of a light device even further.

In a further embodiment, the bonding areas may be provided by means of adhesive, for example comprising a pressure-sensitive adhesive or a hotmelt adhesive. Suitable adhesive may be curable adhesives, solvent-based adhesives or water-based adhesives. Typically, adhesives which are approved by the automotive industry, are suitable, particularly when the light device is being used for a vehicle, as these adhesives generally show a low outgassing behaviour. The bonding may be achieved by the point-wise or area-wise application of adhesive to the surface of the light guide and/or the fibrous layer, respectively, such that the respective material is adhered together to form the bonding area. Adhesive bonding areas are advantageous because the light guide or the fibrous layer does not need to comprise thermoplastic material. Also, application of adhesive can be done easily and in a cost-efficient way. This supports easy and cost-efficient manufacture of a light device even further.

The adhesive may be transparent or translucent. The adhesive material typically has a refractive index similar to or higher than the refractive index of the light guide.

In another embodiment, the bonding areas may be printed on the major side of the light guide defining the light extraction side. Therefore, material providing for bonding may be applied to the surface of the light guide by printing, for example screen-printing. This may include application of adhesive material, thermoplastic material or cross-linkable material.

In one embodiment, light extraction elements may be provided on at least one of the major surfaces of the light guide in order to extract light from the light guide. In a particular embodiment, light extraction elements are arranged on the major side of the light guide which is opposite the major side defining the light extraction side. For example, notches in the surface of the major side of the light guide opposite the light extraction side as described for elongate light guides in EP 594089 (in the name of Minnesota Mining and Manufacturing Company) may be arranged as described above. Other light extraction elements, for example formed on at least one major side by reflective material, are also conceivable. In another embodiment, light extraction elements may be arranged on at least one major side, for example formed by etching, roughening or matting of the surface of the light guide. Also, white dots formed on at least one major side of the light guide are conceivable.

It is understood by the skilled person, that light extraction elements may be formed on one or both sides of the light guide. Also, it is to be understood, that the light extraction elements as described here, may be used in combination with each other and/or in combination with the bonding areas representing light extraction elements.

In another embodiment, the light extraction elements may be provided by arranged material on the major side of the light guide which is opposite to the light extraction side. In a particular embodiment, the light extraction elements may be printed on the major side of the light guide which is opposite to the light extraction side, for example by screen-printing. The light extraction elements may comprise reflective material.

In one embodiment, the light device comprises bonding areas which are arranged in a regular or irregular pattern. This is particularly useful if the bonding areas, as described above, form the light extraction elements, for example, when a specific light extraction is desired. For example, the amount of light extracted out of the light guide along at least one direction in plane with the light guide may be varied.

In one embodiment, the density of the bonding areas may vary in at least one direction in plane with at least one of the major sides of the light guide, for example the length direction. For example, the spacing between the individual bonding areas may increase or decrease in one or both directions perpendicular to each other and in plane with the light guide. Generally, a higher density of light extraction elements causes more light extraction. Furthermore, the light extraction typically decreases with increasing distance from the light source for a light guide having a constant density of light extraction elements.

For example, in order to maintain a substantially uniform output illumination along the light extraction side of the light guide in at least one orthogonal direction in plane with the light guide, for example the length direction, the spacing of successive bonding areas decreases with increasing distance from the light source.

The light guide for use with the light device may be a hollow or solid light guide. The light guide can vary widely in thickness, but in a typical embodiment, the light guide will have a thickness of not more than 10 mm, for example not more than 3 mm or not more than 2 mm. Although the light guide may typically have a generally uniform thickness (within the normal tolerances), it is also contemplated to use a light guide having varying thickness along a side, for example a tapering light guide.

The thinner or slimmer the light device is, the more flexible the light device may be and the more appealing the light device may be. Also, a thin light device will typically offer more assembly flexibilities. Yet further, a thinner light device will also mean less weight and thus may help reduce fuel consumption of a car that includes such a light device for example as part of a motor vehicle such as a car, a bus, a truck or a rail car. The light device according to the invention can be used with other vehicles as well.

In a particular embodiment, the light guide of the light device is a solid light guide comprising a transparent polymeric material having dispersed therein light scattering particles. In a particular embodiment, the light scattering particles used in the light guide may have a refractive index different from the refractive index of the transparent polymeric material of which the light guide is made. Thus, the refractive index of the particles for providing light scattering in the light guide and refractive index of the transparent polymeric material forming the matrix in which the particles are dispersed are different from each other. The difference between the refractive indices can be chosen conveniently by one skilled in the art to obtain the optimal scattering of light within the polymeric matrix of the light guide and to achieve a desired uniform distribution of light in the light guide.

The light guide may comprise polyurethane, polycarbonate or polymethylmethacrylate. The light guide may comprise a thermoplastic polymer or a cross-linked polymer, for example a thermoset resin such as thermoset polyurethane.

In one embodiment, the light guide may comprise a layer of a cross-linked polymer and a layer of thermoplastic polymer defining a bonding layer. This allows for bonding operations of the fibrous layer, typically a woven or non-woven fibrous layer, to the light guide involving thermobonding and/or welding, even if the light guide substantially comprises a cross-linked polymer. The bonding layer of the light guide may be arranged on the major side of the light guide defining the light extraction side, i.e. facing the fibrous layer. In that case, the bonding layer represents the major side of the light guide defining the light extraction side. Furthermore, the thermoplastic material in the bonding layer has typically a similar refractive index as the light guide. Alternatively, the refractive index of the bonding layer may be higher compared to the light guide.

In a further embodiment, the light device may comprise on its light extraction side discrete bonding areas comprising—during the manufacture thereof—non-cross-linked polyurethane, which will form the discrete bonding areas after a cross-linking or curing step. The light guide may consist in this case also of a cross-linkable polyurethane, but already cross-linked or cured, respectively. After application of the non-cross-linked material, the fibrous layer, typically a woven or non-woven fibrous layer, will be arranged on the light extraction side and in contact with the bonding areas comprising non-cross-linked polyurethane, After passing this arrangement to a cross-linking or curing step, the fibrous layer will be bonded to the light extraction side of the light guide. The refractive index of the non-cross-linked polyurethane is typically similar to the refractive index of the light guide.

In a further embodiment, the light guide may be formed on the surface of the fibrous layer, for example by extruding a layer forming the light guide onto the fibrous layer. Thereby, fibers of the fibrous layer may at least partially be embedded in the layer forming the light guide and may bond the light guide thereby to the fibrous layer. Pressure may partially be applied to the fibrous layer and/or the light guide in order to form discrete bonding areas between the two layers.

In still another embodiment, the light guide may comprise on the light extraction side thereof a pattern of discrete bonding areas comprising an adhesive and on the opposite major side a continuous layer of adhesive. In this case, the adhesive entirely coated on the major side of the light guide may have a refractive index lower than that one of the light guide, for example may be a reflective material.

In an embodiment, the light guide is rigid such that it cannot be bent substantially. In a particular embodiment, the light guide is flexible and preferably also elastic. A typical material that may be used to form the light guide is a polyurethane and in particular a cross-linked polyurethane. The term "polyurethane" refers to a polymer that is a reaction product of a multifunctional isocyanate and a polyol and may contain other components.

Other materials that may be used to for the light guide include polyacrylates and silicones.

The light device comprises a fibrous layer. The fibrous layer typically is translucent. A translucent fibrous layer typically allows at least 20%, for example at least 50% of light to be passed through the fibrous layer. Generally, a translucent fibrous layer may have a base weight of 20 g/m$^2$ to 500 g/m$^2$, for example between 50 g/m$^2$ and 250 g/m$^2$.

In a preferred embodiment, the fibrous layer may be coated on the major side thereof facing away from the light guide with a polycoat. A suitable fibrous layer may comprise a non-woven fibrous layer of the type Pegatex-S having a basis weight of 50 g/m$^2$ and a fiber size of 2 denier, commercially available from company Pegas Nonwovens, Znojmo, Czechia, which is coated on one side thereof with 28 g/m$^2$ of a Polyethylene/Polypropylene mixture extruded onto the non-woven fibrous layer to form a polycoat layer. Such a coated non-woven fibrous layer has the advantage that a penetration of a mounting adhesive (used for mounting the light device to a vehicle part on the side opposite to the light extraction side of the light guide) into or through the non-woven fibrous layer, which could have a negative impact on the light extraction by the bonding areas, will be minimized or prevented.

The present invention provides in a further aspect a method of making a light device comprises the steps of:
  providing a light guide having at least one major surface defining a light extraction side,
  providing a fibrous layer, typically a woven or non-woven fibrous layer, on said major side of the light guide defining said light extraction side,
  bonding the fibrous layer to the light guide in a plurality of discrete bonding areas onto said at least one major side of the light guide defining said light extraction elements.

This method provides for an easy to manufacture and cost-efficient light device. Such a light device can also easily and reliably be integrated into parts of a vehicle, for example a door part or a roof part.

In a particular embodiment, the light device further comprises a light source. The light source may comprise light emitting diodes (LEDs). In a particular embodiment, the light device may comprise side-LEDs, for example of the type NSSW 088T, commercially available from company Nichia, Tokyo, Japan. LEDs of the type side-LEDs provide for a compact construction of the light source and the light device as these can for example be surface-mounted on a printed circuit board (SMD-devices). Generally, other SMD-type LEDs may be suitable for a compact construction.

In one embodiment, the light device may comprise reflective material arranged around light source. Such a reflective material may have two opposite major sides, whereby one major side may face towards the light source, light guide and fibrous layer, respectively. This major side may comprise diffuse or specular reflective material such that light emitted by the light source, from the light guide or from fibrous layer, which would be lost for light emission from the major surface of the fibrous layer defining the light extraction side is reflected back towards light source, light guide and/or fibrous layer, respectively. Thereby, illumination can further be enhanced as such a light loss is being decreased.

In one aspect, the present invention provides a use of a light guide as described above for illuminating with ambient lighting. In yet another aspect, the present invention provides a vehicle comprising the light device as described above. In a still further aspect, the invention provides a use of the light device for providing ambient lighting such as for example in a vehicle where illumination of the vehicle interior may be provided. According to this embodiment, the light device is arranged in a door or in the roof of a vehicle. The light device can, typically, easily be integrated in parts of a vehicle, for example door parts or roof parts, for illumination of the vehicle interior providing ambient light. Therefore, the light device may be bonded to a substrate of a vehicle, for example a door part or roof part, with the major side opposite to the major side defining the light extraction side.

In this aspect, the light device may further comprise a second fibrous layer (e.g. woven or non-woven) disposed on the major side of the light guide opposite the major side defining the light extraction side. The second fibrous layer may be bonded to the substrate by a continuous or discontinuous adhesive layer. A further layer, for example a foam layer, may be arranged on the fibrous layer and bonded thereto by a continuous or discontinuous adhesive layer. On top of the foam layer, a further cover layer, for example a cover fabric may be disposed and bonded thereto by a continuous or discontinuous adhesive layer. Such a fabric cover is typically used to cover the side of the door or roof facing towards the interior of a vehicle. Moreover, a light source may be arranged such that it injects light into one of the sides of the light guide. Means for fixing and/or mounting the light source may be provided.

Light injected into the light guide by a light source will propagate along the light guide (between the major sides of the light guide) and may be extracted by light extraction elements provided on the light extraction side and/or by bonding areas on the major side defining the light extraction side functioning as such light extraction elements. Light extracted from the major side of the light guide defining the light extraction side will typically be injected into the fibrous layer disposed on the major side of the light guide defining the light extraction side. The light will generally at least partially be emitted there from into the further layer, for example a foam layer and/or a fabric cover and again into the interior of the vehicle. Ambient illumination of the vehicle interior may thereby be achieved.

No extra space may be needed for light device. The manufacture of the vehicle or parts of the vehicle such as door parts or roof parts may also be simplified.

In still a further aspect, the present invention provides a roll of a light device. In this aspect, the light guide comprises flexible material imparting flexibility of the light device such that it can be wound into a roll. Other layers or components of the light device, i.e. the fibrous layer, the bonding areas, optional further adhesive, are typically flexible as well. This may be advantageous during the manufacture of the light device as well as during the manufacture of a vehicle, for which the light device may be used. Car manufacturers can have stock of rolled light device(s) prior to the integration of the light device into the vehicle. At the time of manufacture of the vehicle or integration of the light device into the vehicle, the car manufacturer could simply provide a roll of a light device, unwind the necessary amount of light device including cutting to size and shape, and continue with manufacturing and/or integration. This could be of cost-advantages and/or reduce the time for manufacture or integration.

The following is a summary of embodiments:

1. Light device comprising
   a light guide having at least one major side defining a light extraction side,
   at least one fibrous layer disposed on the major side of said light guide defining said light extraction side,
   whereby said at least one fibrous layer is bonded to the major side of said light guide defining said light extraction side in a plurality of discrete bonding areas.

2. Light device according to embodiment 1, whereby said plurality of discrete bonding areas define light extraction elements.

3. Light device according to any of embodiments 1 or 2, whereby said light guide further comprises light extraction elements.

4. Light device according to any of embodiments 1 to 3, wherein the light guide comprises polyurethane, polycarbonate or polymethylmethacrylate.

5. Light device according to any of embodiments 1 to 4, wherein the said light guide comprises a thermoplastic polymer or a cross-linked polymer.

6. Light device according to any of embodiments 1 to 5, wherein the said light guide comprises a layer of cross-linked polymer and a bonding layer comprising a thermoplastic polymer.

7. Light device according to any of embodiments 1 to 6, wherein the at least one fibrous layer is bonded to a major surface of said light guide by means of thermobonding.

8. Light device according to any of embodiments 1 to 6, wherein the at least one fibrous layer is bonded to a major surface of said light guide by means of welding.

9. Light device according to embodiment 8, wherein the means of welding comprises ultrasonic welding or laser welding.

10. Light device according to any of embodiments 1 to 6, wherein the at least one fibrous layer is bonded to a major surface of said light guide by means of adhesive.

11. Light guide according to embodiment 10, wherein the means of adhesive comprises a pressure sensitive adhesive or a hot-melt adhesive.

12. Light device according to any of embodiments 1 toll, whereby the bonding areas are arranged in a regular or irregular pattern.

13. Light device according to any of embodiments 1 to 12, whereby the light guide is a solid light guide.

14. Light device according to any of embodiments 1 to 13, whereby the light guide comprises flexible material.

15. Light device according to any of embodiments 1 to 14, whereby said bonding areas are arranged in a major portion of said at least one major side defining said light extraction side.

16. Light device according to any of embodiments 1 to 15, further comprising light extraction elements on a major side opposite to said major side defining said light extraction side, whereby the density varies along at least one direction in plane with the light guide.

17. Light device according to any of embodiments 1 to 16, further comprising a light source and reflective material arranged around light source.

18. Light device according to any of embodiments 1 to 17, further comprising diffuse or specular reflective material disposed on at least one the major surfaces of said light guide.

19. Light device according to any of the embodiments 1 to 18 wherein the fibrous layer is a non-woven fibrous layer.

20. Method of making a light device according to any of embodiments 1 to 19, the method comprises the steps of:
   providing a light guide having at least one major surface defining a light extraction side,
   providing a fibrous layer on said major side of the light guide defining said light extraction side,
   bonding the fibrous layer to the light guide in a plurality of discrete bonding areas onto said at least one major side of the light guide defining said light extraction elements.

21. Method of making a light device according to embodiment 20, further comprising the step of winding the light guide with the fibrous layer arranged on said at least major side defining said light extraction side into a roll.

22. Vehicle comprising a light device according to any of embodiments 1 to 19, whereby the light device is arranged in a door or in the roof.

23. Use of a light device according to any of embodiments 1 to 19 for illuminating with ambient lighting.

24. Use of a light device according to any of embodiments 1 to 19 for illuminating the interior of a vehicle with ambient lighting.

25. Roll of a light device according to any of embodiments 14 to 19.

DETAILED DESCRIPTION OF THE DRAWINGS

The invention will now be described in more detail with reference to the following illustrative embodiments and examples, without the intention to limit the invention thereto.

Figure 1:
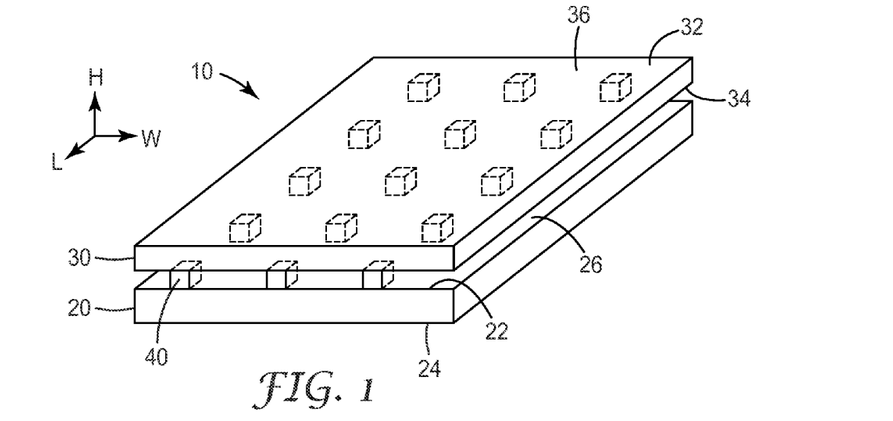
FIG. 1 is a perspective view of a first embodiment of the light device.
Figure 2:
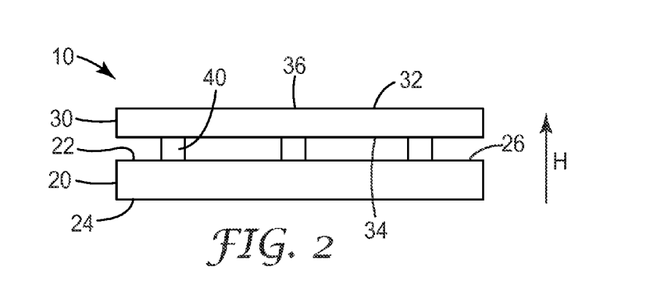
FIG. 2 is a cross-sectional view of the light device as shown in FIG. 1.

FIGS. 1 and 2 show a first embodiment of the light device 10 comprising a light guide 20 having a first major side 22, which defines the light extraction side 26, and having a second major side 24 opposite to the major side 22. Furthermore, a non-woven fibrous layer 30 is shown in FIGS. 1 and 2 having a first major side 32, which defines a light emission side 36, and having a second major side 34, which is opposite the major side 32 and which is facing towards the light guide 20.

A plurality of bonding areas 40 is arranged on the light guide 20 on its major side 22 defining the light extraction side 26. The non-woven fibrous layer 30 is bonded to the light guide 20 in the bonding areas 40.

Figure 3:
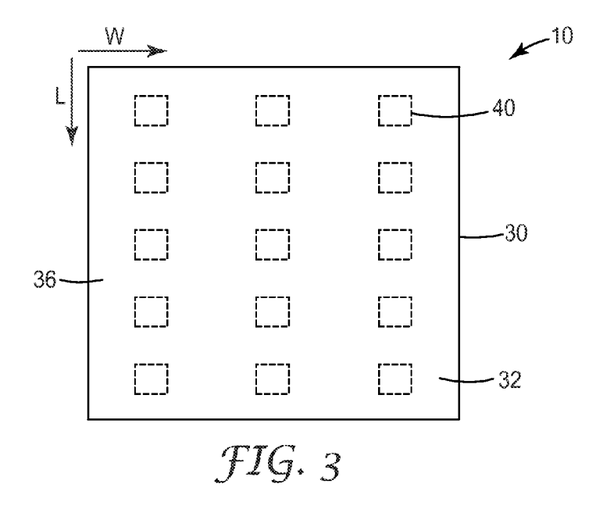
FIG. 3 is a top view of the light device as shown in FIG. 1.

FIG. 1 illustrates that arrangement of the plurality of bonding areas 40 in a pattern, i.e. in parallel rows, which can also be seen in FIG. 3 representing a top view of the embodiment as shown in FIGS. 1 and 2. In FIG. 2, only one row of bonding areas can be seen. Further rows of bonding areas 40 are shown in dotted lines as these are arranged underneath the non-woven fibrous layer 30.

Figure 4:
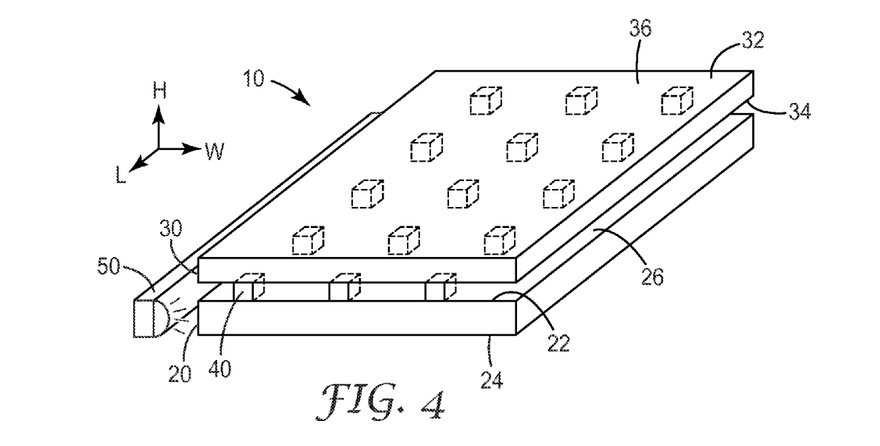
FIG. 4 is a perspective view of an arrangement of the light device as shown in FIG. 1 with a light source.
Figure 5:
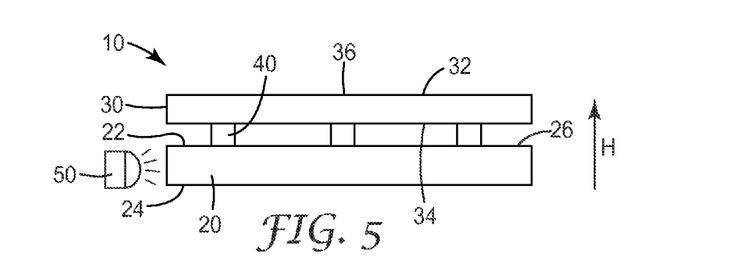
FIG. 5 is a cross-sectional view of the light device as shown in FIG. 4.
Figure 6:
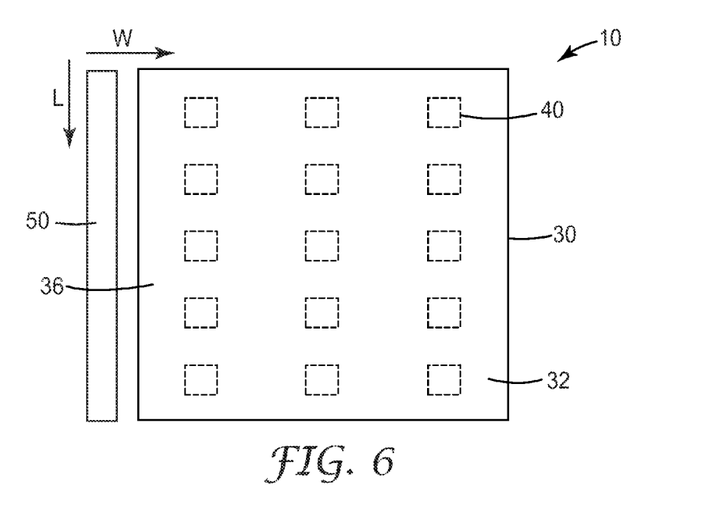
FIG. 6 is a top view of the light device as shown in FIG. 4.

FIGS. 4 to 6 show an arrangement of the light device 10 as shown in FIGS. 1 to 3 with a light source 50. As can be seen in FIGS. 4 and 6, the light source 50 is arranged in parallel to one of the sides of the light guide 20 being perpendicular to the major sides 22, 24 such that it couples light into that side of the light guide 20.

Light impinging on one side of the light guide 20 will enter the light guide 20 and will be propagated substantially along the two directions in plane with the light guide 20. Light impinging on a major side may be reflected back into the light guide 20. When light impinges on a location, where a bonding area 40 is arranged, light may be extracted from the light guide 20 into the non-woven fibrous layer 30 (i.e. substantially in direction H), see FIG. 5.

Figure 7:
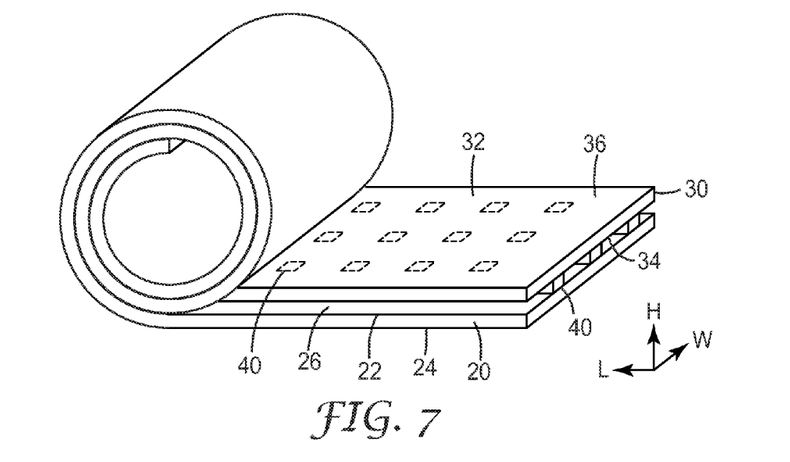
FIG. 7 is a perspective view of a roll of a light device as shown in FIG. 1.

FIG. 7 is a perspective view of a roll of a light device 10 as shown in FIG. 1. The light device 10 comprises a flexible light guide 20 and a non-woven fibrous layer 30, which is bonded to the major side 22 of the light guide 20 defining the light extraction side 26. After making the light device 10, it may be wound into a roll. For illustrative purposes, the light device 10 is partially unwound in order to show the light guide 20, the non-woven fibrous layer 30 and one row of bonding areas 40. Further rows of bonding areas 40 are shown in dotted lines.

In this embodiment, the light guide 20 as well as the non-woven fibrous layer 30 are flexible. The bonding areas 40 may either be flexible, i.e. one single bonding area 40 may be flexible, or the bonding areas 40 are small enough in order to not prevent flexibility of the light device 10. Any further layer or component, for example adhesive, is typically also flexible and/or elastic.

Figure 8:
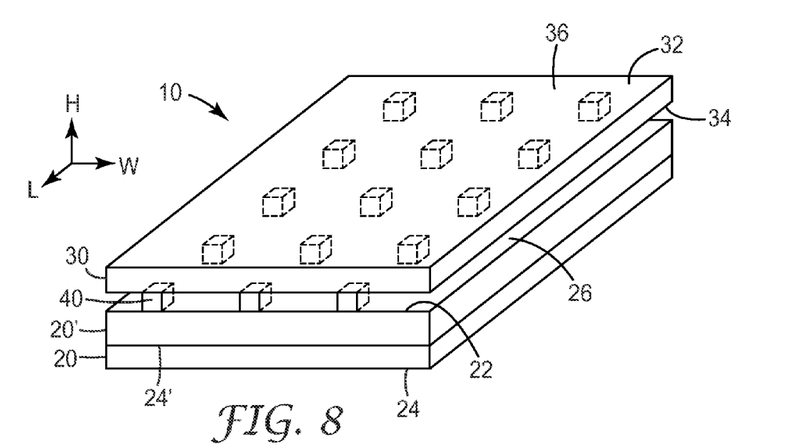
FIG. 8 is a perspective view of another embodiment of the light device.
Figure 9:
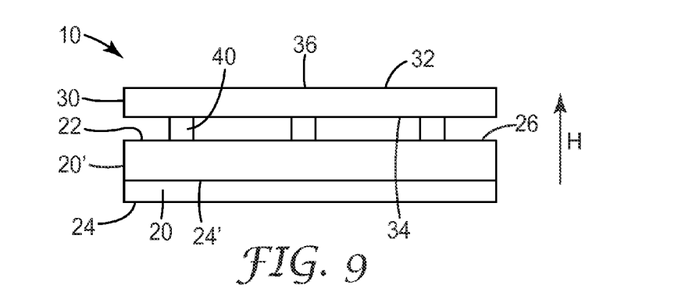
FIG. 9 is a cross-sectional view of the light device as shown in FIG. 8.

FIGS. 8 and 9 show another embodiment of the light device 10, in which the light guide 20 comprises a bonding layer 20' facing towards the non-woven fibrous layer 30. Bonding layer 20' comprises thermoplastic material to facilitate thermo-bonding or welding of the non-woven fibrous layer 30 to the light guide 20. FIGS. 8 and 9 only show one row of bonding areas 40, whereby further rows of bonding areas 40 are shown in dotted lines in FIG. 8.

Figure 10:
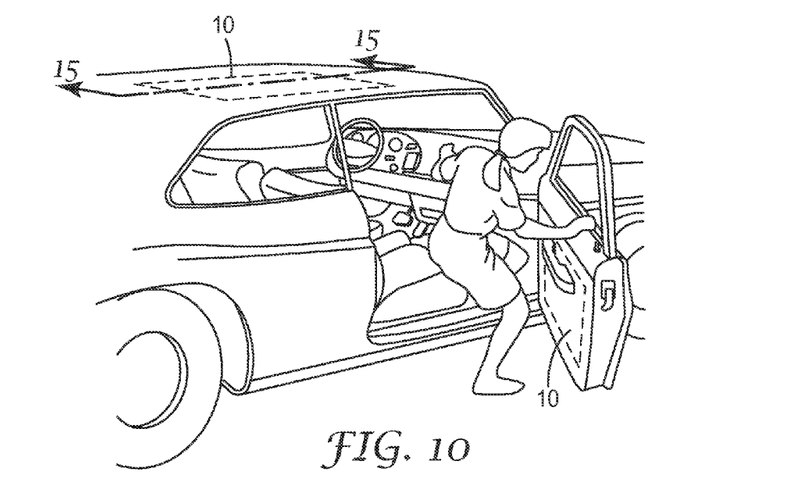
FIG. 10 is a light device according to the first or second embodiment arranged in a vehicle.
Figure 11:
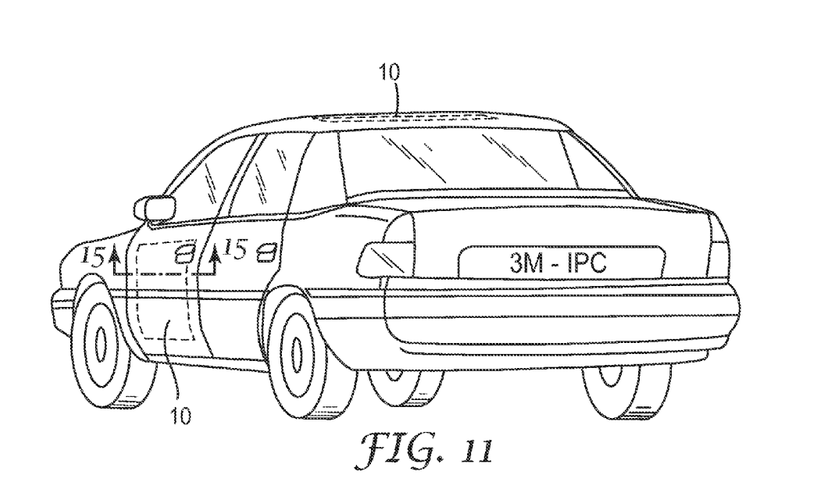
FIG. 11 is a light device according to the first or second embodiment arranged in a vehicle.

FIGS. 10 and 11 show the light device 10 integrated into a vehicle. As shown, light device is arranged in a door panel as illustrated by dotted lines (light device 10 is covered in FIG. 10 by further layers such as foam layers, further adhesive layers and/or fabric cover layers and by sheet metal and/or further layer of the door in FIG. 11). Furthermore, the integration of the light device 10 in a roof panel of a vehicle is illustrated by dotted lines (in this perspective, light device 10 is covered by sheet metal of the roof).

Figure 14:
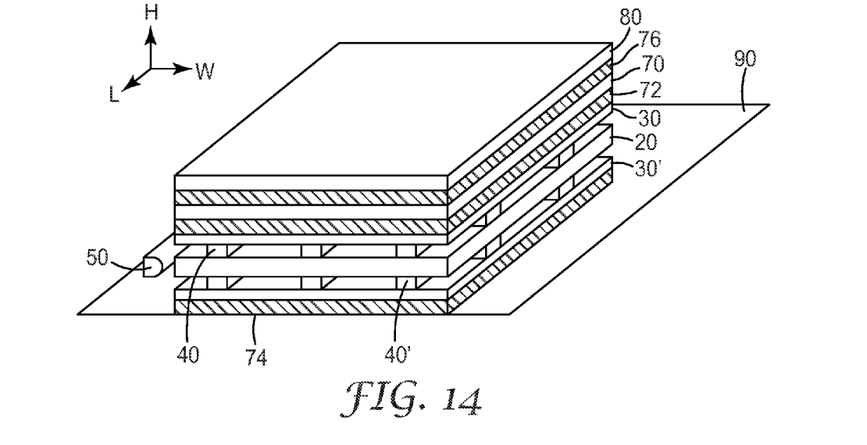
FIG. 14 is a perspective view of the embodiment as shown in FIG. 10 or 11 cut along line X-X.
Figure 15:
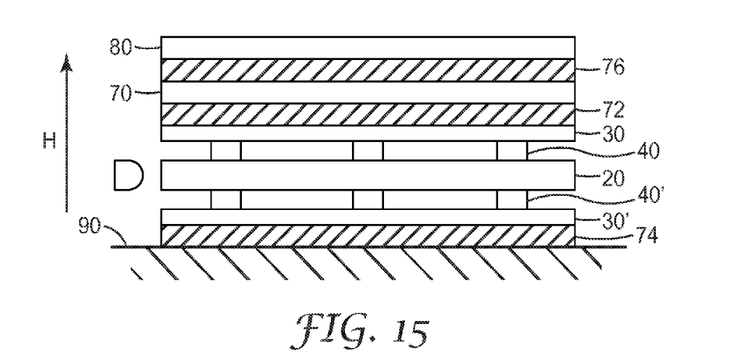
FIG. 15 is a cross-sectional view of the embodiment as shown in FIG. 10 or 11 cut along line X-X.

More details about the integration of a light device 10 into a vehicle or parts thereof, for example a door or a roof, can be seen in FIGS. 14 and 15.

Figure 12:
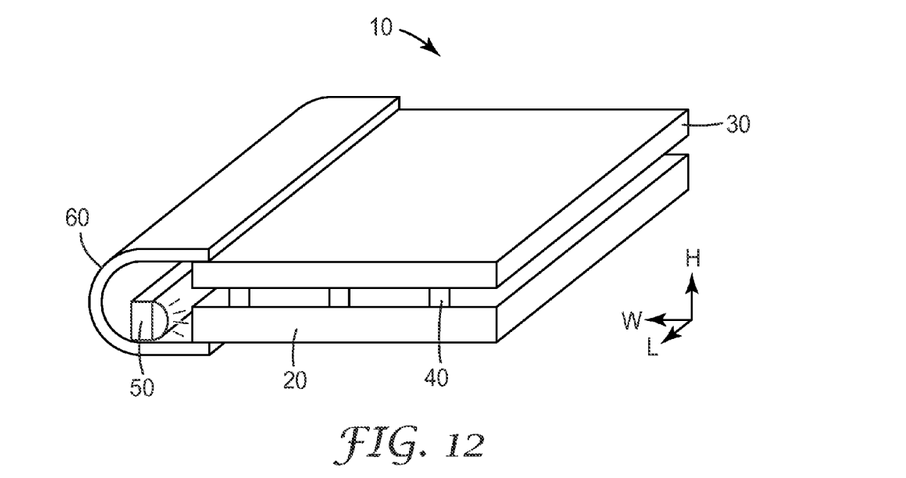
FIG. 12 is a perspective view of a third embodiment of the light device.
Figure 13:
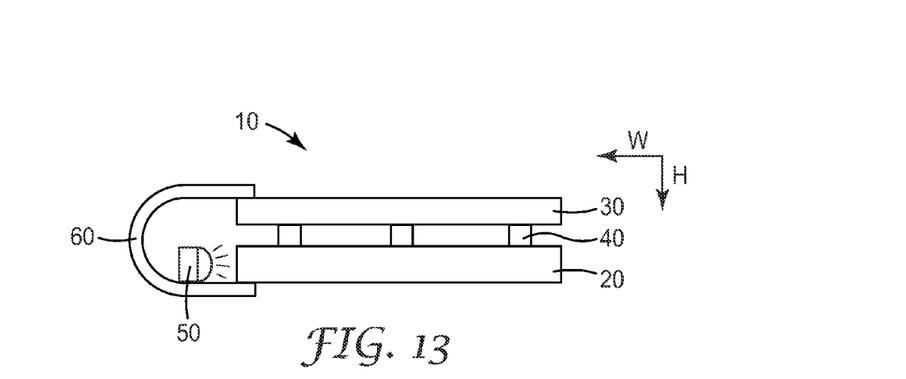
FIG. 13 is a cross-sectional view of the light device as shown in FIG. 12.

FIGS. 12 and 13 show a third embodiment of the light device 10 comprising reflective material 60 arranged around light source 50. Reflective material 60 has opposite major sides, whereby one major side is facing towards the light source 50, light guide 20 and non-woven fibrous layer 30, respectively. This major side comprises diffuse or specular reflective material such that light emitted by the light source 50, from the light guide 20 or from non-woven fibrous layer 30, which would be lost for light emission from the major surface 36 of the non-woven fibrous layer 30 (36 not indicated in FIGS. 12 and 13, see FIGS. 1 to 9) is reflected back towards light source 50, light guide 20 or from non-woven fibrous layer 30, respectively. Thereby, illumination can further be enhanced as such a light loss is being decreased.

FIGS. 14 and 15 show the embodiment as shown in FIG. 10 or 11, i.e. a light device 10 being integrated into a vehicle, cut along line X-X. In addition to the light device 10 as shown in FIGS. 1 to 6, the light device 10 further comprises a second non-woven fibrous layer 30', disposed on the lower major side 24 of the light guide 20 and bonded thereto by a plurality of bonding areas 40' similar to the bonding of the non-woven fibrous layer 30 to the major side 22 of the light guide 20 with the bonding areas 40. Furthermore, the light device is arranged on a substrate 90 such as a door panel or roof panel. Therefore, the second non-woven fibrous layer 30' is bonded on the one hand to the substrate 90 by an adhesive layer 74, which may be continuous or discontinuous. On the other hand, non-woven fibrous layer 30' is bonded to the light guide 20 on its major side 24 opposite the major side 22 defining the light extraction side 26. A foam layer 70 is further arranged on the (first) non-woven fibrous layer 30 and bonded thereto by an adhesive layer 72, which may be continuous or discontinuous. On top of the foam layer 70, a further cover layer, e.g. a cover fabric 80 may be disposed and bonded thereto by an adhesive layer 76, may be continuous or discontinuous. Such a fabric cover 80 is typically used to cover the side of the door or roof facing towards the interior of a vehicle. Moreover, a light source 50 is arranged such that it injects light into one of the sides of the light guide 20. Means for fixing and/or mounting the light source 50 are provided, but for the reason of simplification not shown in FIGS. 14 and 15.

Light extracted from the upper major side 22 of the light guide 20 will be injected into the non-woven fibrous layer 30. The light will at least partially be emitted there from into the foam layer 70 and fabric cover 80 and again into the interior of the vehicle. Ambient illumination of the vehicle interior will be achieved thereby.

Figure 16:
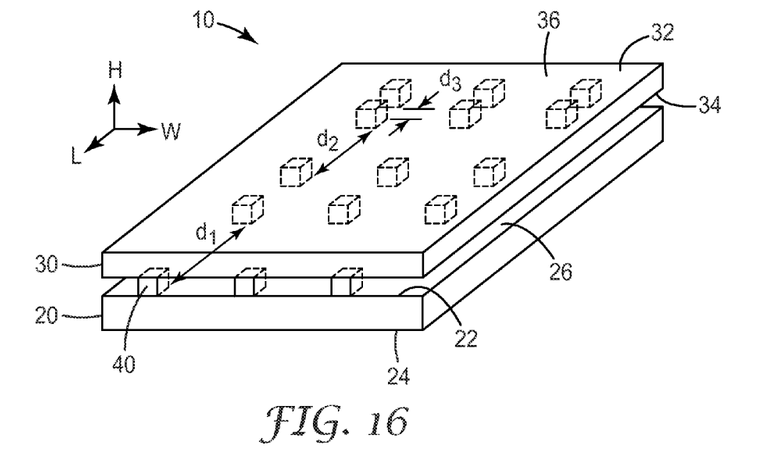
FIG. 16 is a perspective view of another embodiment of the light device.
Figure 17:
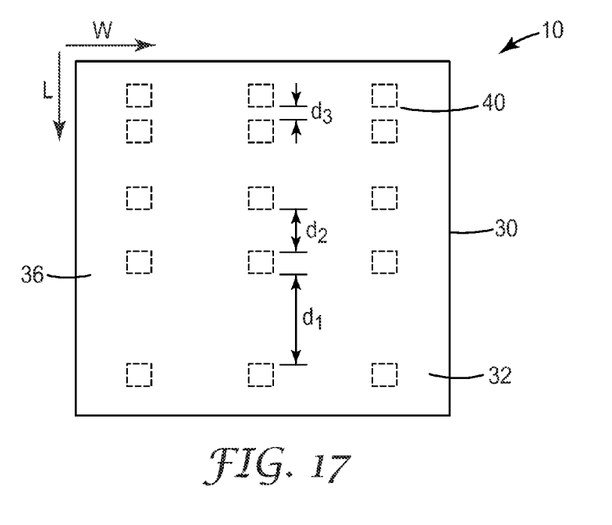
FIG. 17 is a top view of another embodiment as shown in FIG. 16.

FIGS. 16 and 17 show another embodiment of the light device 10 in which the density of the bonding areas 40 vary in at least one direction in plane with the light guide 20, for example the length direction L as indicated with arrow labelled L shown in FIGS. 14 and 15. This means that the spacing between the individual bonding areas 40 functioning as light extraction elements may increase or decrease in said direction depending on the desired effect. In order to maintain a substantially uniform output illumination along the light extraction side 26 of the light guide 20 in at least one direction in plane with the light guide 20, the spacing of successive bonding areas 40 is decreased successively so as to compensate for the light reflected out of the light guide 20 by preceding bonding areas 40 functioning as light extraction elements.

The invention claimed is:

1. Light device comprising
   a light guide having at least one major side defining a light extraction side,
   at least one fibrous layer disposed on the major side of said light guide defining said light extraction side,
   whereby said at least one fibrous layer is bonded to the major side of said light guide defining said light extraction side in a plurality of discrete bonding areas.

2. Light device according to claim 1, whereby said plurality of discrete bonding areas define light extraction elements.

3. Light device according to claim 1, whereby said light guide further comprises light extraction elements.

4. Light device according to claim 1, whereby the bonding areas are arranged in a regular or irregular pattern.

5. Light device according to claim 1, whereby the light guide is a solid light guide.

6. Light device according to claim 1, whereby the light guide comprises flexible material.

7. Light device according to claim 1, whereby said bonding areas are arranged in a major portion of said at least one major side defining said light extraction side.

8. Light device according to claim 1, further comprising light extraction elements on a major side opposite to said major side defining said light extraction side, whereby the density varies along at least one direction in plane with the light guide.

9. Light device according to claim 1, further comprising a light source and reflective material arranged around light source.

10. Light device according to claim 1 wherein the fibrous layer is a non-woven fibrous layer.

11. Method of making a light device as claimed in claim 1, the method comprises the steps of:
    providing a light guide having at least one major surface defining a light extraction side,
    providing a fibrous layer on said major side of the light guide defining said light extraction side,
    bonding the fibrous layer to the light guide in a plurality of discrete bonding areas onto said at least one major side of the light guide defining said light extraction elements.

12. Vehicle comprising a light device as claimed in claim 1, whereby the light device is arranged in a door or in the roof.

13. Use of a light device as claimed in claim 1 for illuminating with ambient lighting.

14. Use of a light device as claimed in claim 1 for illuminating the interior of a vehicle with ambient lighting.

* * * * *

UNITED STATES PATENT AND TRADEMARK OFFICE
CERTIFICATE OF CORRECTION

| | | |
|---|---|---|
| PATENT NO. | : 8,777,473 B2 | Page 1 of 1 |
| APPLICATION NO. | : 13/885441 | |
| DATED | : July 15, 2014 | |
| INVENTOR(S) | : Eric Schmuck et al. | |

It is certified that error appears in the above-identified patent and that said Letters Patent is hereby corrected as shown below:

In the Claims

<u>Column 13</u>
Line 19, delete "may" and insert -- which may --

Signed and Sealed this
Eleventh Day of November, 2014

Michelle K. Lee
*Deputy Director of the United States Patent and Trademark Office*